United States Patent [19]

Kawaguchi

[11] 4,371,215

[45] Feb. 1, 1983

[54] DUAL TYPE HYDRAULIC CIRCUIT IN A VEHICLE BRAKE SYSTEM

[75] Inventor: Hiroshi Kawaguchi, Mishima, Japan

[73] Assignee: Toyota Jidosha Kabushiki Kaisha, Aichi, Japan

[21] Appl. No.: 221,569

[22] Filed: Dec. 31, 1980

Related U.S. Application Data

[63] Continuation of Ser. No. 961,603, Nov. 17, 1978, abandoned.

[30] Foreign Application Priority Data

Nov. 17, 1977 [JP] Japan .................. 52-138334

[51] Int. Cl.³ .............................................. B60T 8/18
[52] U.S. Cl. .................. 303/22 R; 303/6 C; 188/106 P
[58] Field of Search .............. 303/6 C, 22 R, 6 A, 303/6 R, 84 A, 111, 84 R, 22 A; 188/349, 345, 195, 106 P

[56] References Cited

U.S. PATENT DOCUMENTS

| 3,804,468 | 4/1974 | Ishikawa et al. ............ 303/6 C |
| 4,028,658 | 6/1977 | Nakamura et al. .......... 303/6 C |
| 4,053,186 | 10/1977 | Jakobi ........................ 303/6 C |
| 4,299,426 | 11/1981 | Hales et al. ................. 303/6 C |

FOREIGN PATENT DOCUMENTS

| 2748699 | 5/1978 | Fed. Rep. of Germany ...... 303/6 C |
| 1444397 | 7/1976 | United Kingdom ............ 303/22 R |
| 1478136 | 6/1977 | United Kingdom . |
| 1484535 | 9/1977 | United Kingdom . |
| 1513128 | 6/1978 | United Kingdom . |
| 1521769 | 8/1978 | United Kingdom . |
| 1531803 | 11/1978 | United Kingdom . |
| 2008216 | 5/1979 | United Kingdom ............ 303/6 C |
| 1557051 | 12/1979 | United Kingdom . |

Primary Examiner—Douglas C. Butler
Attorney, Agent, or Firm—Browdy and Neimark

[57] ABSTRACT

A dual hydraulic circuit in a vehicle brake system having two mutually independent piping systems wherein a tandem master cylinder is in communication with wheel cylinders provided on right and left rear wheels, respectively, and a valve device for controlling pressure levels of brake fluid in the two hydraulic piping systems. The valve device comprises a housing, and two valve pistons received therein each of which controls the hydraulic braking pressure to be exerted to the corresponding rear wheel cylinder. The two valve pistons are operated together by a resilient force of one single spring acting thereon whereby, in the event of a hydraulic pressure failure in either one of the two piping systems, the valve piston in the still operative system is unable to initiate its pressure control operation until the same piston alone overcomes the resilient force of the spring.

4 Claims, 5 Drawing Figures

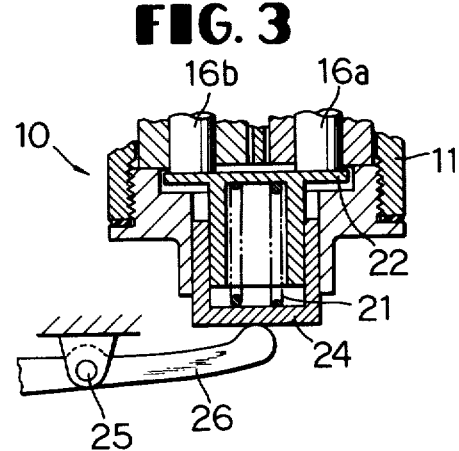
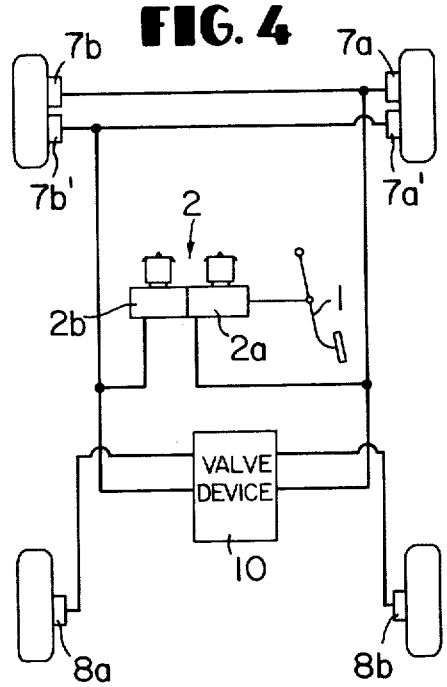
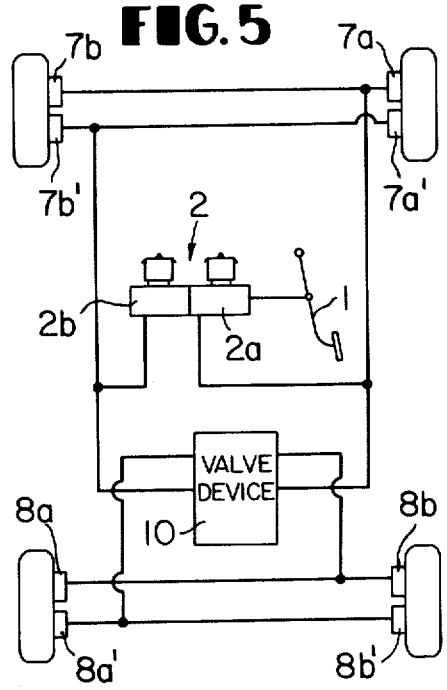

DUAL TYPE HYDRAULIC CIRCUIT IN A VEHICLE BRAKE SYSTEM

This is a continuation, of application Ser. No. 961,603 filed Nov. 17, 1978 now abandoned.

BACKGROUND OF THE INVENTION

The present invention relates generally to improvements in a hydraulic power brake system widely in use on automobiles and other vehicles, and more particularly to a dual type hydraulic circuit characterized by a control valve for regulating pressure levels of brake fluid in two independent hydraulic circuits of an automotive dual or split brake system.

Keeping pace with a recent trend in automobiles seeking higher driving speed under the progressively aggravating conditions of traffic environment, there has been and is presently a growing need for the safer and more reliable brake systems. To meet this need, most of the vehicles now in use are utilizing a dual or split type of hydraulic power brake system wherein a dual master cylinder is in communication with each of the wheel (brake) cylinders through two mutually independent piping systems thereby preventing a simultaneous failure of all wheel brakes when a fluid leak or any other pressure failure has occurred at a certain point in the hydraulic circuitry.

The typical method to serve this purpose has been to provide a so-called "diagonal" piping arrangement in which right front and left rear wheel cylinders are communicating within one piping system while left front and right rear wheel cylinders are connected by another piping system, or to provide a type piping arrangement which comprises a first piping system wherein the two front wheel cylinders are in communication with one of the rear wheel cylinders, and a second piping system wherein the two front wheel cylinders are connected to the other rear wheel cylinder. Such a dual type brake system commonly incorporates hydraulic pressure control valves (such as proportioning, load-sensing proportioning and inertia valves) in its circuits so as to improve directional control capability and steerability of the vehicle during brake applications. The reason for the provision of these control valves mentioned above is primarily for adjusting relative levels of hydraulic pressure between the front and rear wheel cylinders, especially while the pressure in a master cylinder or braking pressure is held at a higher level, in order to compensate for transfer of a considerable percentage of weight of the vehicle from the rear wheels to the front wheels when the brakes are applied for a sudden deceleration. In other words, the control valves are necessitated to attain, as much as practical, an optimum distribution of the hydraulic pressure to the front and the rear wheel cylinders; i.e., to adjust the front and rear brake forces to their optimum ratio.

In a dual type hydraulic circuit as employing the diagonal type piping arrangement, however, each one of the two piping systems has conventionally required one corresponding control valve and therefore a total of two control valves should be incorporated to achieve the optimum control of the brake forces between the front and rear wheel brakes. Unfortunately, the use of the two control valves contains a potential of a difference in hydraulic pressure level between the two piping systems because of a difference in performance characteristics between the two control valves (more particularly, due to a difference in preset value of load being applied to the two corresponding springs against which the control valves are operated). Another disadvantage incurred from using the two control valves is that a critical danger might happen when a pressure failure takes place by chance in either one of the two piping systems. That is to say, because the two control valves are designed and constructed so that the front and rear wheel brake pressures are controlled in accordance with an optimum distribution curve which is determined on the assumption that the both piping systems are always normal in function, a pressure failure in either piping system not only results in a drastic reduction of the entire braking effect but also may cause a large deviation from the predetermined optimum distribution curve between the front and rear brake pressure levels. In this condition, the front brake pressure tends to have a higher rising rate than the rear brake pressure, causing the front wheel to prematurely lock up and slip on the road surface.

SUMMARY OF THE INVENTION

Accordingly, it is the primary object of this invention to provide a dual type hydraulic circuit wherein the hydraulic braking pressure levels are regulated by a single control valve.

It is another object of this invention to provide a dual type hydraulic circuit wherein there exists no difference in hydraulic braking pressure between the two piping systems as long as the both systems are normally functioning.

It is still another object of the invention to provide a dual type hydraulic circuit wherein, in the event of a pressure failure in either one of the two piping systems, the braking pressure to be applied to a rear wheel cylinder in the normal piping system is automatically increased to a higher level than in the case where the two piping systems are normally working.

The foregoing objects of this invention are successfully achieved by the provision of an improved hydraulic valve that controls the levels of the braking pressure in the two mutually independent piping systems. The principal feature of the control valve comprises the fact that two valve pistons are received, respectively, within the two mutually independent fluid passages each being formed within a one-piece housing and constituting a part of each of the two hydraulic piping systems, so as to control the hydraulic pressure levels in said two piping systems. In the valve housing of the present invention, said two valve pistons are operated together by a resilient force of one single spring thereby permitting a control of the braking pressure in each of the two independent hydraulic systems.

Other and further objects, features and advantages of the invention will appear more fully to those skilled in the art from a reading of the following description with reference to the accompanying drawings.

BRIEF DESCRIPTION OF THE DRAWINGS

The invention is illustrated in the accompanying drawing wherein:

FIG. 3 is an elevational section view partially cut away to illustrate an essential portion of a load-sensing proportioning type valve device for carrying out another alternative embodiment of the invention.

FIG. 4 is a dual type hydraulic circuit embodying the invention in connection with a piping arrangement.

FIG. 5 is still another alternative embodiment of the invention in connection with a completely dual type hydraulic circuit.

DETAILED DESCRIPTION OF THE PREFERRED EMBODIMENTS

Figure 1:
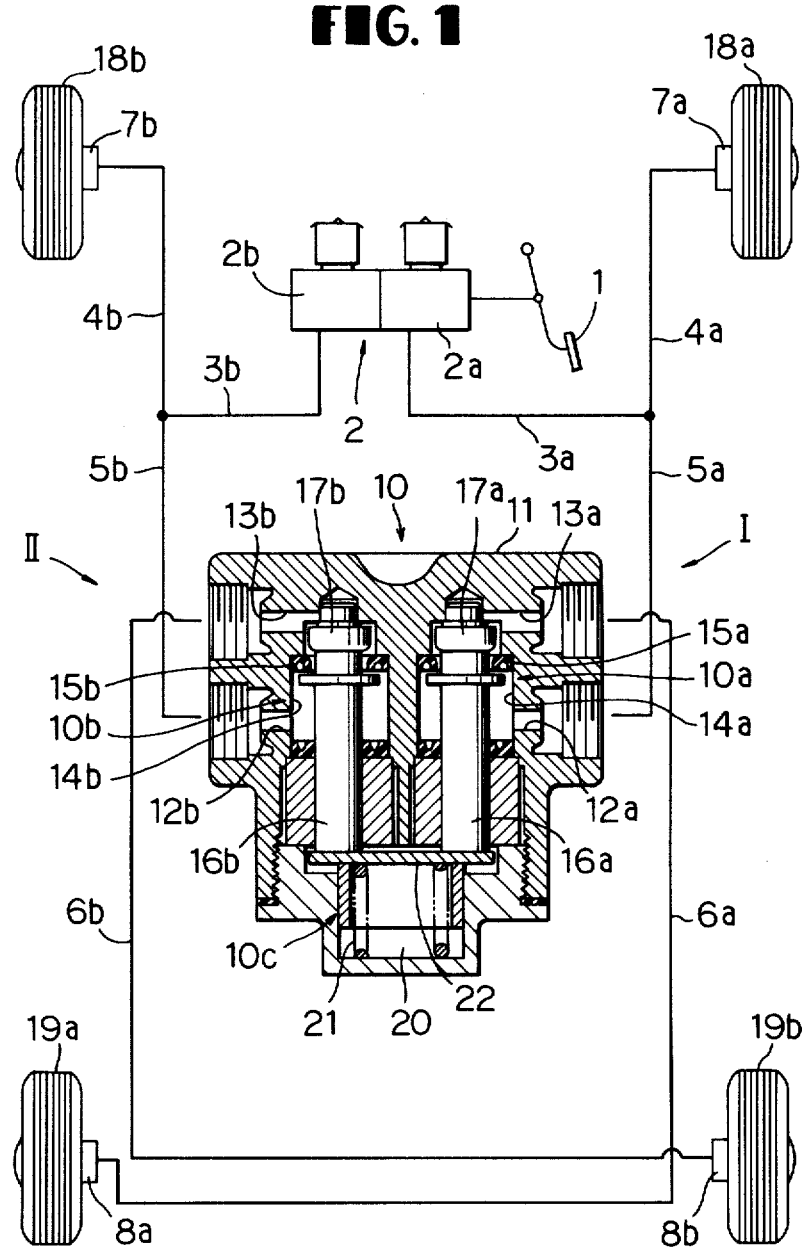
FIG. 1 is a schematic diagram of a preferred embodiment of a diagonal type dual hydraulic circuit in accordance with this invention, including an elevational section view of a proportioning type valve device.

FIG. 1 illustrates a typical diagonal type dual hydraulic circuit in accordance with this invention, including a detailed cross-sectional view of a control valve 10 which is functionally identical to a proportioning valve. As shown in the figure, a dual master cylinder 2 is provided with one primary piston in a first pressure chamber 2a and one secondary piston in a second pressure chamber 2b which are connected in tandem to a brake pedal 1. During normal operation, actuating the master cylinder by the brake pedal depression will build up a substantially equal level of hydraulic pressure in the both pressure chambers 2a and 2b, which is relative to a force being applied to the brake pedal 1. The pressure chamber 2a is connected to a wheel cylinder 7a provided on a right front wheel 18a by a conduit 3a and a branch conduit 4a, and to a first proportioning valve portion 10a formed within a valve device 10 by a branch conduit 5a. From the first proportioning valve portion 10a, the pressure fluid fed from the first pressure chamber 2a is directed through a conduit 6a to a wheel cylinder 8a on the left rear wheel 19a which is located diagonally with respect to the front wheel 18a. In the similar manner, pressure fluid built up in the second pressure chamber 2b is fed to a wheel cylinder 7b on the left front wheel 18b through a conduit 3b and a branch conduit 4b, and to a wheel cylinder 8b on the right rear wheel 19b (situated diagonally to the left front wheel 18b) through a conduit 5b, a second proportioning valve portion 10b formed within the valve device 10, and a conduit 6b. The first pressure chamber 2a, conduit 3a, branch conduit 4a, front wheel cylinder 3a, branch conduit 5a, first proportioning valve portion 10a, conduit 6a and rear wheel cylinder 8a constitutes a first hydraulic system. On the other hand, a second hydraulic system is constituted by the second pressure chamber 2b, conduit 3b, branch conduit 4b, front wheel cylinder 7b, branch conduit 5b, second proportioning valve portion 10b, conduit 6b and rear wheel cylinder 8b.

The valve device 10 comprises a one-piece housing 11, a first proportioning valve portion 10a, a second proportioning valve portion 10b, and a spring portion 10c acting on the valve portions 10a and 10b. The first proportioning valve portion 10a is disposed between an inlet port 12a which is connected to the branch conduit 5a leading to the first pressure chamber 2a, and an outlet port 13a which is connected to the rear wheel cylinder 8a by the conduit 6a. The same valve portion 10a comprises a cylinder bore 14a formed in communication with the ports 12a and 13a, a valve seat 15a formed within the bore 14a, a valve piston 16a slidably received in the bore 14a, an end portion of the valve piston 16a being exposed to an air chamber 20, and a valve poppet 17a formed as an integral part of the valve piston 16a, which is forced onto or off the valve seat 15a to close or open a passage of pressure fluid within the bore 14a. The valve piston 16a and the valve poppet 17a are constructed so that while the poppet 17a is held in contact with the valve seat 15a, the pressure-receiving area of the valve piston 16a exposed to the pressure fluid in a portion of the bore 14a in communication with the wheel cylinder 8a is greater than that exposed to the pressure fluid in another portion of the bore 14a in communication with the pressure chamber 2a in the master cylinder 2. Similarly, the second proportioning valve portion 10b is disposed between an inlet port 12b connected to a branch conduit 5b leading to the second pressure chamber 2b, and an outlet port 13b connected to the rear wheel cylinder 8b by the condit 6b. The same valve portion 10b comprises a cylinder bore 14b formed in communication with the ports 12b and 13b, a valve seat 15b formed within the bore 14b, a valve piston 16b, slidably received in the bore 14b, an end portion of the valve piston 16b being exposed to the air chamber 20, and a valve poppet 17b formed as an integral part of the valve piston 16b, which is forced onto or off the valve seat 15b to close or open a passage of pressure fluid within the bore 14b. The first and second proportioning valve portions 10a and 10b previously stated are arranged so that the corresponding valve pistons 16a and 16b are positioned in parallel. The spring portion 10c acting on the proportioning valve portions 10a and 10b is disposed in such manner that it is opposed to the ends of the valve pistons 16a and 16b that are exposed to the air chamber 20. The same spring portion 10c includes a spring 21 received within the air chamber 20, and a transmission member 22 being in contact with the spring 21 and with said ends of the valve pistons 16a and 16b to receive a resilient force of the spring 21 and transmit the same force to the valve pistons 16a and 16b thereby operating the same pistons together.

During normal operation of the hydraulic circuit thus constructed in accordance with the present invention, the pressure fluid from the two mutually independent pressure chambers 2a and 2b is separately directed to the corresponding front wheel cylinders 7a in the first hydraulic system and 7b in the second hydraulic system through the conduit 3a and branch conduit 4a, and the conduit 3b and branch conduit 4b, respectively. Therefore, the pressure in the front wheel cylinders or front brake pressure rises at the same rate as the pressure generated in the master cylinder 2. On the other hand, the pressure fluid from the master cylinder 2 is fed to the rear wheel cylinders 8a and 8b in the two separate hydraulic systems through the proportioning valve portions 10a and 10b of the valve device 10 whereby the rear brake pressure in the both hydraulic systems is controllable. In detail, the pressure fluid forced out of the pressure chambers 2a and 2b is delivered up to the corresponding rear wheel cylinders 8a and 8b through the conduit 3a, branch conduit 5a, inlet port 12a, first proportioning valve portions 10a, outlet port 13a, and conduit 6a, and through the conduit 3b, branch conduit 5b, inlet port 12b, second proportioning valve portion 10b, outlet port 13b and conduit 6b, respectively. While the pressure in the rear wheel cylinders is considerably low, or the valve pistons 16a and 16b of the valve device 10 are both held at their upper position (as viewed in the drawing) by the transmission member 22 against which a resilient force of the spring 21 of the spring portion 10c is being exerted, and the valve poppets 17a and 17b are therefore held off the corresponding valve seats 15a and 15b, allowing a flow of the pressure fluid to the rear wheel cylinders 8a and 8b whereby the braking pressure in each of the rear wheel cylinders will rise at the same gradient as the master cylinder pressure. When the pressure in each of the rear wheel cylinders has reached a specified level, the hydraulic force pressing the valve pistons 16a and 16b toward the air chamber 20 (toward the bottom of the drawing) becomes greater than the resilient force of the spring 21 and consequently the valve pistons 16a and 16b are moved toward the air chamber 20 against the spring force until the valve poppets 17a and 17b are brought into contact with the valve seats 15a and 15b thereby initiating a well-known pressure control operation during which the pressure in the rear wheel cylinders 8a and 8b will rise at a lower gradient than the pressure in the master cylinder 2. As long as the hydraulic pressure from the master cylinder is normally transmitted, as described above, to each of the wheel cylinders through the first and second hydraulic systems, the valve device 10 constructed in accordance with this invention will function as the two proportioning valves having the valve pistons 16a and 16b which are operated together by a resilient force of the one single spring 21 thereby achieving an intended control of the braking pressure in each of the first and second hydraulic systems. Thus, one feature of the present invention is to make it possible to integrate into one single valve unit the two control valves which have been conventionally incorporated in the two separate hydraulic piping systems, respectively. Another feature of the invention is the provision of one single spring which acts on the above two control valves. This latter features makes it possible to reduce the number of parts required, and to substantially equalize the hydraulic pressure levels at which the valve pistons (16a and 16b) in the two hydraulic systems may initiate its normal pressure control operation, and in addition, to minimize a difference in the braking pressure between the two hydraulic systems (which is caused, for example, by a difference in preset load being applied to the two springs).

Additional feature of a dual type hydraulic circuit of the present invention is that it may achieve a superior effect especially when a pressure failure has occurred in either the first or the second hydraulic system and the braking pressure in the wheel cylinders in the faulty system has not been raised to a specified level. In other words, as long as the both hydraulic systems are in normal condition, the corresponding valve pistons will initiate the previously stated pressure control operation when the same braking pressure level has been reached in the both hydraulic systems because the resilient force of the one spring is acting equally onto the both pistons. For example, however, if a pressure failure should occur in the second hydraulic system no fluid pressure would exert on the valve piston 10b in the second hydraulic system, and the valve piston 16a in the unchangedly operative system naturally needs a fluid pressure substantially two times a pressure required when the both systems are normal, to resist the spring 21 because the entire resiliency of the spring 21 is acting on the piston 16a alone. As a result, the braking effect on a rear wheel in the normal hydraulic system is significantly increased. This increase in the braking pressure in a rear wheel cylinder in the event of a pressure failure in one of the hydraulic systems, makes it possible to achieve better distribution of the braking pressure to the front and rear wheel cylinders than has been achieved by the two conventional control valves. Furthermore, unlike the conventional control valves which are commonly complicated to an extreme extent in construction because of the provision of extra pipes and other components for the purpose of increasing the pressure level at which the control valves start their pressure control actions in the event of a hydraulic failure, a dual type hydraulic circuit in accordance with this invention can achieve the same purpose without the need of extra components only by simply utilizing the one single spring 21 received within the valve device 10. Thus, the invention has still another feature that it provides a dual hydraulic circuit considerably simple in construction.

Although the foregoing description presents a preferred embodiment of the present invention, it is to be understood that the invention is not limited to this precise form, and that modifications and alterations may occur to those skilled in the art without departing from the spirit and scope of the invention.

Figure 2:
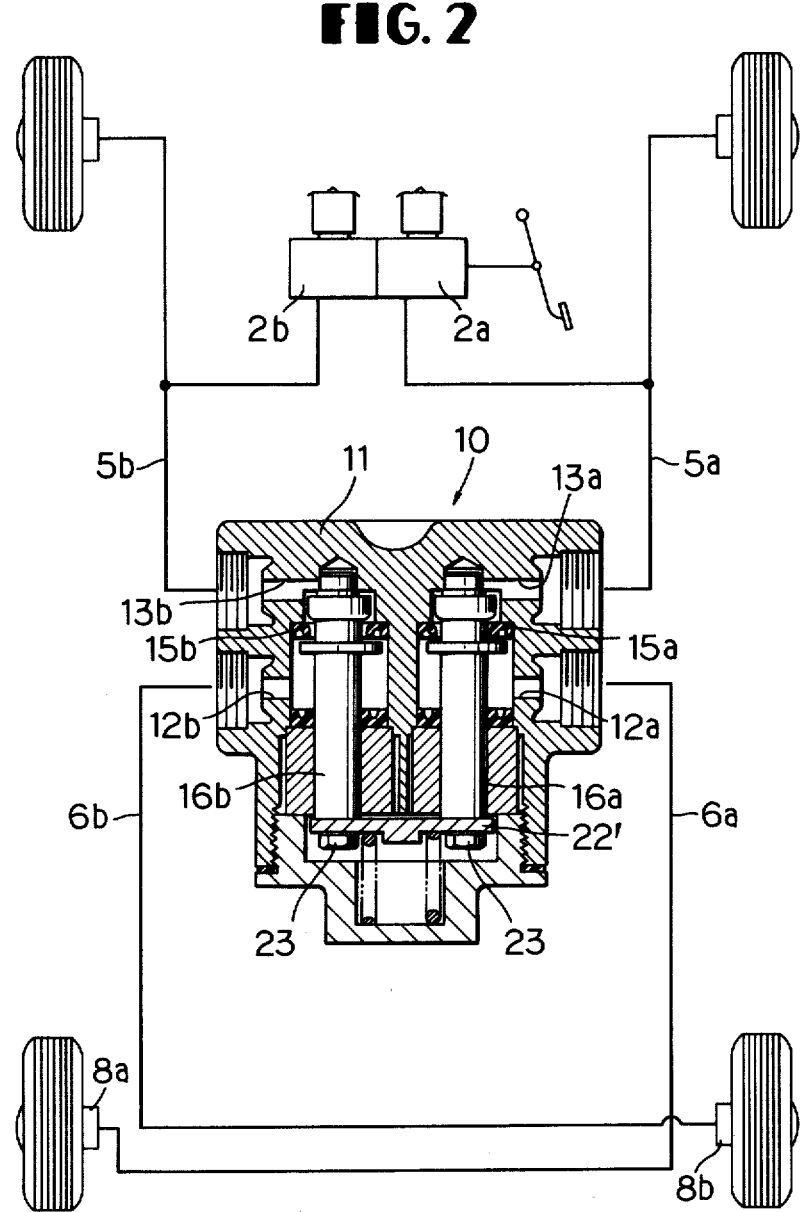
FIG. 2 is a schematic diagram of an alternative embodiment of a diagonal type dual hydraulic circuit, including an elevational section view of a limit type valve device.

By way of an example, a transmission member 22' of a second embodiment illustrated in FIG. 2 may be substituted for the transmission member 22 of the first embodiment which is held just in contact with the ends of the valve pistons 16a and 16b. In the second embodiment, the valve pistons are fixed with screws 23 to the transmission member 22' which, as a result, does not require such guiding portions as used in the first embodiment whereby the member 22' may be a plate like piece of simple construction. In addition, the valve device 10 may function as a pressure limit valve if the conduit 5a is connected to the port 13a, the conduit 6a to the port 12a, the conduit 5b to the port 13b and the conduit 6b to the port 12b as illustrated in FIG. 2. With this type of arrangement wherein the connection of each pair of conduits 5a and 6a, and 5b and 6b is reversed, the valve poppets 17a and 17b will be held in contact with the corresponding valve seats 15a and 15b after the fluid pressure in the master cylinder chambers 2a and 2b has reached a preset level because while the valve poppets 17a and 17b are held on the valve seats 15a and 15b the pressure-receiving areas of the valve pistons 16a and 16b exposed to the pressure fluid from the valve seats to the rear wheel cylinders 8a and 8b are designed and constructed to be smaller than the areas exposed to the pressure fluid from the valve seats to the master cylinder 2. Thus, the braking pressure in the rear wheel cylinders 8a and 8b will not rise subsequently.

A third embodiment of the invention is illustrated in FIG. 3 in which, unlike a fixed spring seat shown in FIGS. 1 and 2, a seat 24 for the spring 21 is movable in parallel with a line of movement of the transmission member 22 by a lever 26 which is pivoted around a pin 25 with on end being in contact with the seat 24 as a load applied to the rear wheels is varied. Thus, in operation, a load to be applied to the spring 21 is variable as the rear wheel load is changed. This indicates that the valve device 10 may function as a load-sensing valve. This FIG. 3 embodiment is otherwise similar to the first two embodiments described above, as indicated by the broken lines at the top of the Figure.

In addition, the diagonal piping arrangement previously detailed may be replaced by the type of arrangement illustrated in FIG. 4 or by a completely dual type arrangement illustrated in FIG. 5.

More in detail, the present invention is also applicable to the type of dual hydraulic circuit wherein each of the two front wheels is respectively provided with a pair of wheel cylinders 7a, 7a', and 7b, 7b', as shown in FIG. 4, and each wheel cylinder on each of the two front wheels, for example, 7a and 7b, are connected to a wheel cylinder 8b on a right-rear wheel to form one hydraulic piping system; and each of the other wheel cylinders 7a' and 7b' on the two front wheels are connected to a wheel cylinder 8a on the left-rear wheel to form another hydraulic piping system. The present invention is further applicable to another type of dual type hydraulic circuit, see FIG. 5, wherein each of the four wheels is respectively provided with a pair wheel cylinders, 7a, 7a', 7b, 7b', 8a, 8a', 8b, and 8b' respectively. Wheel cylinders 7a, 7b, 8a, and 8b on each of the four road wheels, four cylinders in all, are connected to each other for forming one hydraulic piping system, and the remaining four wheel cylinders 7a', 7b', 8a', and 8b' are similarly connected to each other to form another hydraulic piping system. In either of the two types shown in FIGS. 4 and 5, pressure in the wheel cylinders on the rear wheels is placed under control of the valve device 10 shown in FIGS. 1, 2, or 3.

What is claimed is:

1. A dual type hydraulic circuit for a vehicle brake system including (1) a dual master cylinder building up hydraulic braking pressure relative to the degree of depression of a brake pedal; (2) at least one wheel cylinder disposed at each of the right and left rear road wheels of the vehicle; (3) two mutually independent hydraulic piping systems which connect said dual master cylinder to said rear wheel cylinders; and (4) valve means incorporated in said two piping systems, said valve means comprising:

(a) a housing having two mutually independent fluid passages therein each of which constitutes a portion of said two hydraulic piping systems respectively;
   (b) two valve seats formed one within each respective one of said one fluid passages;
   (c) two valve pistons each having a valve poppet adapted to contact said corresponding valve seat, and being axially movable for bringing said valve poppet thereof onto and off of said corresponding valve seat, said valve pistons being disposed in parallel to one another and both being exposed at respective one ends thereof to an air chamber formed within said housing, with a result that, as long as said valve poppets are held in contact with said valve seats, the pressure-receiving areas of said valve pistons exposed to a portion of said fluid passages in communication with said rear wheel cylinders are greater than those of said valve pistons exposed to another portion of said passages in communication with said master cylinder;
   (d) a compression spring urging said two pistons away from said air chamber;
   (e) transmission means interposed between said two valve pistons and said spring for transmitting the resilient force of said spring to said two valve pistons to make them operate together and, upon rising of the hydraulic pressure in said master cylinder beyond a predetermined upper limit, the hydraulic braking pressure in said rear wheel cylinders being controlled to rise at a lower gradient than the hydraulic pressure in said master cylinder, said transmission means including a first portion disposed within said housing and slidable in parallel with a line of movement of said two valve pistons to cause the resilient force of said spring to act in parallel with said line and further including a second portion fixed to said first portion, which second portion is a plate-like configuration and is in contact with one end of said spring at the middle thereof to receive the resilient force of said spring, and in contact with said two pistons at opposite end portions thereof to evenly deliver said resilient force to said two pistons at said opposite end portions thereof; said end portions of said second portion extending outwardly of said first portion of said transmission means;
   (f) said first portion of said transmission means comprising a hollow cylindrical member;
   (g) a movable seat member, means to mount said movable seat member in contact with the other end of said spring and so as to permit said seat member to move substantially in parallel with said line of movement of said transmission means,
   (h) said movable seat member comprising a bottom and a hollow cylindrical member, said movable seat cylindrical member being slidably mounted on the outside of and telescopically fitted to said transmission means first portion;
   (i) said movable seat member bottom and said transmission means first portion defining a space in which said compression spring is housed; and
   (j) means to move said movable seat member in response to variations of the load applied to said rear wheels;

whereby the axial movements of said valve pistons are controlled in accordance with the varying magnitude of the load applied to said rear wheels.

2. A circuit as claimed in claim 1, wherein each of said two mutually independent hydraulic piping systems connected to said right and left rear wheel cylinders, respectively, is connected at a portion thereof between said valve means and said master cylinder to a front wheel cylinder located diagonally to each of said right and left rear wheels.

3. A circuit as claimed in claim 1, wherein one of said two mutually independent hydraulic piping systems connected to said right and left rear wheel cylinders, respectively, is connected at a portion thereof between said valve means and said master cylinder to a pair of wheel cylinders one being located at the right front wheel and the other at the left, and the other one of said two mutually independent hydraulic piping systems is connected at said portion thereof to another pair of wheel cylinders one being located at said right front wheel and the other at the left.

4. A circuit as claimed in claim 1, wherein said movable seat member is slidably fitted in said housing with said bottom protruding outwardly of said housing, and said first portion is slidably fitted in said movable seat member.

* * * * *